E.coli

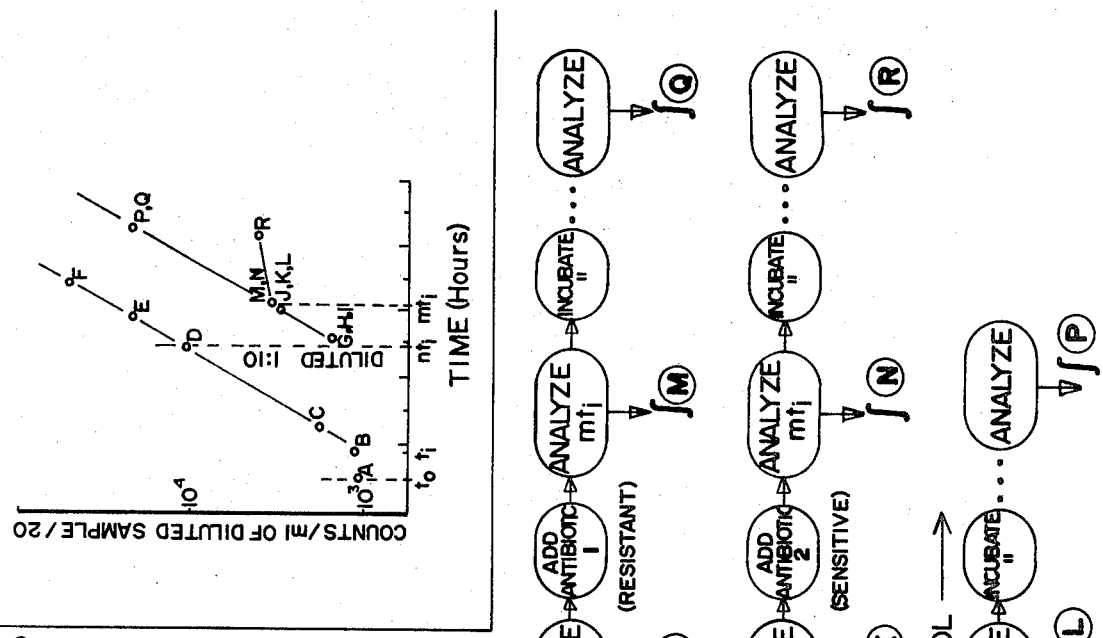
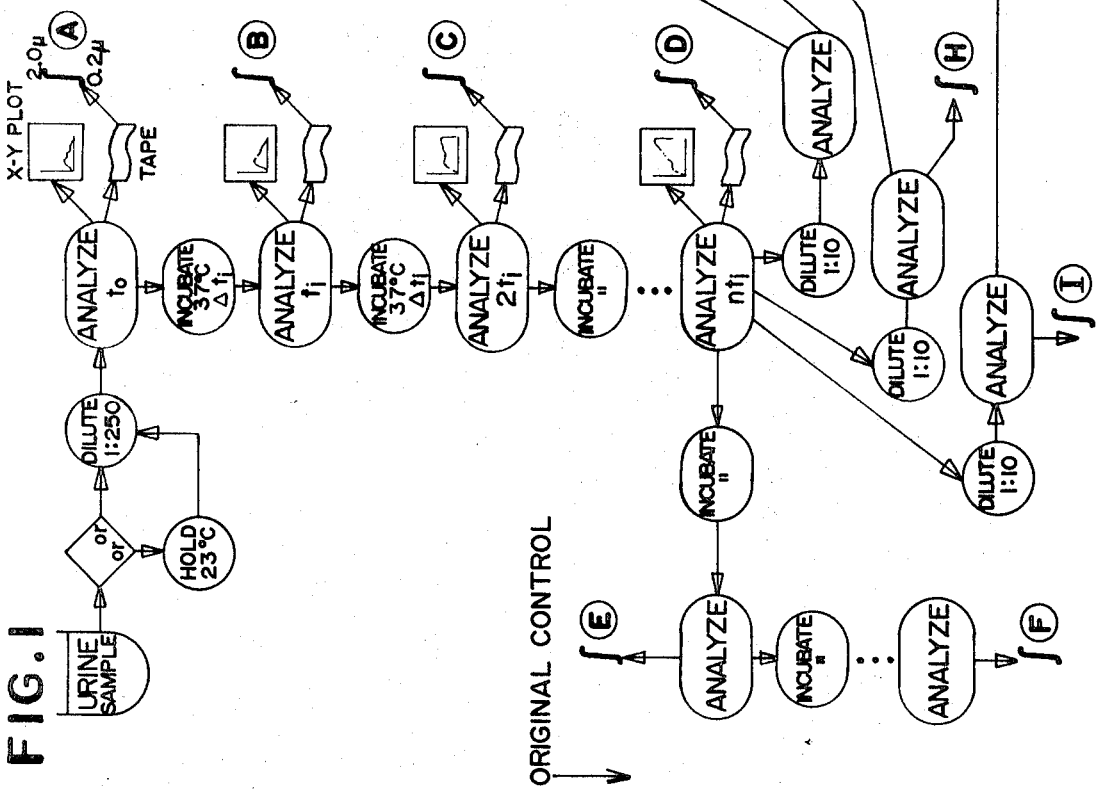

Klebsiella

Proteus

Pseudomonas

United States Patent Office 3,804,720
Patented Apr. 16, 1974

3,804,720
DYNAMIC METHOD OF IDENTIFYING MICROBES AND EVALUATING ANTI-MICROBIAL PROCESSES
William A. Curby, 1663 Commonwealth Ave., West Newton, Mass. 02165
Filed May 2, 1972, Ser. No. 249,601
Int. Cl. C12k 1/00
U.S. Cl. 195—103.5 R                13 Claims

ABSTRACT OF THE DISCLOSURE

The present invention relates to a new method of identifying a micro-organism and evaluating anti-microbial processes in which a liquid containing a sample of a micro-organism is evaluated in a multichannel analyzer to determine its dynamic growth profile as expressed in terms of total count and size distribution of the microbe population.

BACKGROUND OF THE INVENTION

This invention provides an automated microbiological assay process which results in substantial savings in time as compared with classical microbiological methods which employ plate counts of organisms that are cultured for periods of 24 hours or more on suitable media. There is no necessity to grow out a pure colony and the present invention may be employed with mixed populations of organisms. The present invention provides a novel method for the identification of a micro-organism which is extremely rapid. It may be applied to identify or detect the presence of organisms which are commonly encountered in industrial or medical microbiological laboratories.

The present invention is also concerned with a method of evaluating an anti-microbial challenge to a particular organism or mixed populations of organisms.

It is an object of this invention to provide a novel method for the identification of a micro-organism by means of a multichannel analyzer.

It is an object of this invention to provide a novel method of determining the sensitivity of a micro-organism to an antimicrobial challenge.

It is an object of this invention to provide a novel method for the diagnosis of microbiologically induced pathogenic conditions in animals.

It is an object of this invention to provide a near real-time system for providing information on the dynamic action of micro-organisms.

It is an object of this invention to provide a near rela-time method for monitoring and reporting in digital or analog form the dynamic growth patterns of in vivo populations of micro-organisms.

These and other objects of the present invention will be readily apparent from a reading of the folloiwng description of the invention.

The present invention relates to a novel automated micro-biological assay technique having industrial and medical applications. Rapid results are obtained as the data is provided in a computer compatible form.

As used herein, the micro-organism is used to include bacteria, fungi, algae, and yeasts. As used herein, the identification includes the process of elucidating the genus of a particular micro-organism. In actual practice when applied to particular problems of identification which are encountered in a medical diagnostic laboratory, the invention is particularly useful in providing sufficient indicia of the nature of the organism so as to suggest a particular mode of treatment. The invention employs a particle sensor such as an optical particle densitometer or a sensor which operates on the Coulter principle, circuitry for interfacing the sensor to a multichannel analyzer, a multichannel analyzer, data manipulation equipment and analog or digital reporting equipment. As an alternate embodiment, the sensor may be directly interconnected to suitable recording means such as magnetic tape or any other suitable data storage system. Thereafter, the stored data may be fed into the multichannel analyzer or an alternate method may be employed such as a variable threshold loop recycle technique.

The Coulter principle particle sensor or sensor pulse generating means has no theoretical lower limit on the size of the particle which can be measured. Practical limitations result from the selection of the aperture size, the cleanliness of the fluid holding the particles and the electronic noise level of the circuitry amplifying the pulses generated by the sensor. For the monitoring of bacteria from body fluids, applicant has found that an aperture size of between $10\mu$ and $200\mu$ in diameter may be used in monitoring particles having an apparent diameter of from $0.1\mu$ to $50.0\mu$. It is preferred to operate with an aperture size of $30\mu$–$100\mu$ for the routine monitoring of particles having an apparent diameter of $0.2\mu$ to $2.0\mu$.

Sensors which operate on the Coulter principle are described in U.S. 2,656,508 and U.S. 2,869,078 which are hereby incorporated by reference.

The sensors which operate on the Coulter principle are based on the phenomenon that a solid particle, when passing through an electric current path, will modulate the electric current flow in the path to produce a detectable change in the electrical characteristics of the path. The particular sensor is constructed so that a fluid suspension may be drawn as a result of a pressure differential through the electric field by means of an aperture window in an insulated or glass vessel containing one electrode. The other electrode is mounted in a larger vessel which contains the sample which is to be passed through the electric field.

The sensor device responds to the exposed cross-sectional area of the particle and is usually independent of the dielectric properties of the material. Thus, the size of the particles passed through the electric field as well as the total number may be detected.

The output from the sensor is connected through proper matching and amplifying circuits to a pulse height analyzer. This device has means for identifying the height of the pulse with a corresponding channel number. Means are also provided for tabulating the number of pulses falling into each channel and for displaying the stored data as a hard copy readout. Also, there may be included means for conversion to analog form for an X–Y display on an oscilloscope or X–Y hard copy plotter.

A suitable pulse height analyzer is the RIDL-34-20 which is manufactured by Radiation Instrument Development Laboratory. This particular analyzer has 200 channels but other analyzers having greater or lesser numbers of channels may be employed. The RIDL-34-20 may be employed with a Dumont 403B oscilloscope as a monitor, and includes a tape readout, locator and scan repeater, an impedance matching circuit, a pulse amplitude analyzer and integrator, an analog to digital converter, a $4 \times 10^4$ bit core storage unit, 200 multi-channel CRT display. A Mosley 7035 X–Y plotter provides an analog readout.

BRIEF DESCRIPTION OF THE DRAWINGS

FIG. 1 is a flow chart which illustrates the method of the invention as it relates to the selection of an antibiotic for the treatment of a urogenital infection by means of the isolation of the pathogenic vector from a urine specimen.

FIG. 2 is a growth/time graph which is used to plot the results obtained in the analytical procedure depicted in FIG. 1.

Figure 3:
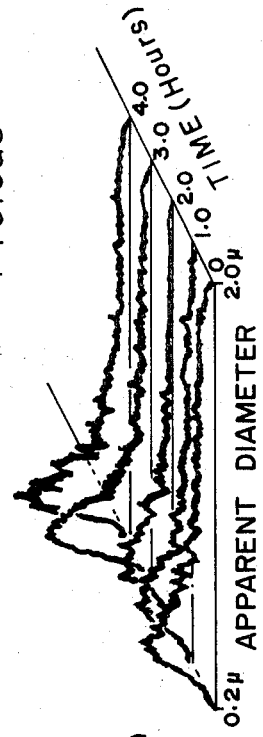
FIG. 3 is a three-dimensional graph which illustrates the size distribution shift of *E. coli* as a function of time.
Figure 5:
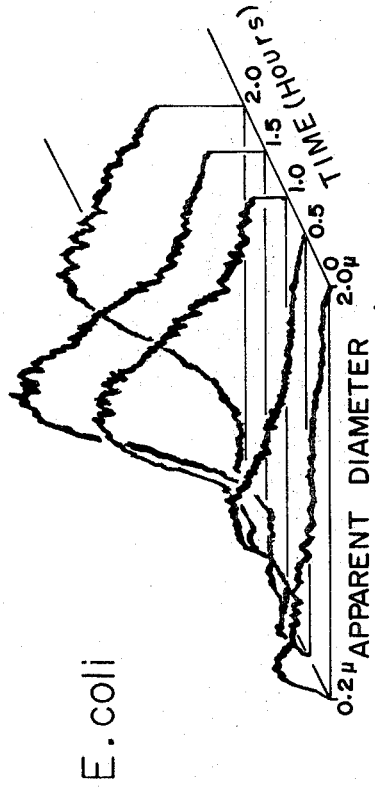
FIG. 5 is a three-dimensional graph which illustrates the size distribution shift of Klebsiella as a function of time.
Figure 4:
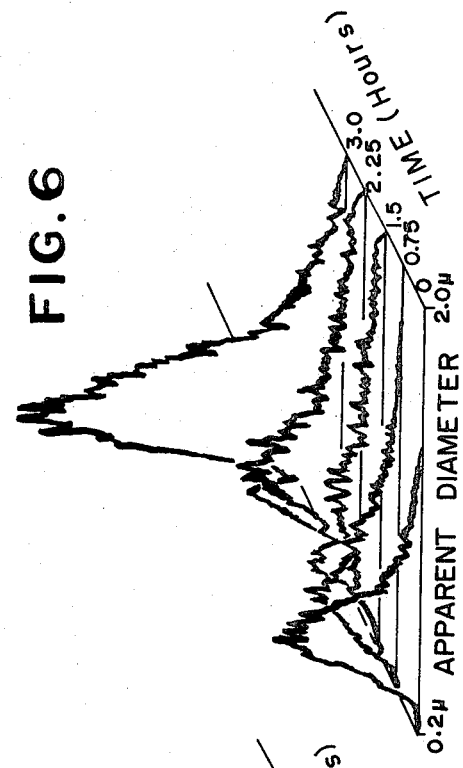
FIG. 4 is a three-dimensional graph which illustrates the size distribution shift of Proteus as a function of time.
Figure 6:
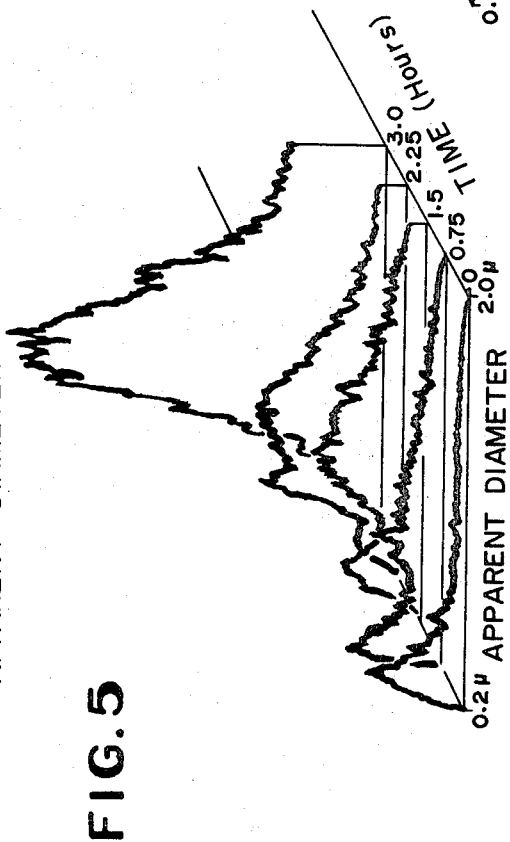
FIG. 6 is a three-dimensional graph which illustrates the size distribution shift of Pseudomonas as a function of time.

The identification of unknown micro-organisms, and in particular bacteria, is based on the observation that when a total particle count and particle distribution count is taken of a growing bacterial culture at periodic intervals, a population distribution shift is observed. This population distribution shift is characteristic of the species of bacteria growing in the same media and may be employed to identify the organism.

A convenient manner of illustrating this phenomenon is shown in FIGS. 3–6 wherein three-dimension graphs have been employed to show the total particle count as the height of the curve, the width of $0.2\mu$–$2.0\mu$ representing the particle size distribution and the time representing the results of analyses at the stated intervals. This technique provides extremely rapid results as compared with classical plate culturing methods of identification. The value of rapid identification of particular organisms is of interest to the industrial microbiologist. This information may be life-saving in the case of acute systemic infections which are caused by resistant bacteria.

While FIGS. 3–6 only represent 4 particular types of organisms, characteristic curves of population distribution shifts may be readily prepared by those skilled in the art using organisms identified by classical methods or obtained from culture collections such as ATCC or NRRL.

The particular media which may be employed is designated as "standard media" and is not critical providing that it has been made particle free by any suitable means and may be selected from any standard reference work on microbiology. Good results have been obtained with brain heart infusion broth and trypticase soy broth.

The practical operating conditions for dynamic microbiological analysis have been set out hereinbelow in Table I. They are not critical and certain predetermined amounts have been set forth as a general guide to enable those skilled in the art to practice the invention.

The predetermined time intervals at which analyses are repeated may vary from about 0.01 hour to about 4 hours. It is preferred, however, to operate in the range of about 0.05 hour to about 1 hour. The results of each run may be plotted on a separate graph and thereafter, compared with similar standards. As an alternate, the data may be processed in digital form and automatically analyzed by computer.

Generally, it has been found that at least three successive analyses are required to provide sufficient information to identify the particular organism, although with certain rapidly growing organisms such as *E. coli*, two successive analyses may be sufficient to provide sufficient information as to the growth characteristics in order to identify the organism.

Medical microbiology includes the identification of particular organisms and the selection of appropriate antimicrobial agents for use in the treatment of pathological conditions which are caused by these organisms. It is necessary to have techniques available which facilitate the analysis of organisms isolated from swabs of body surfaces or body fluids from body surfaces such as abdomen, rectal fistulas, blood vessels, gall bladder, paraovarian cysts, the perianal region, the bowel lumen, the nose, the throat and the urogenital area. The present invention may be applied to all of these body fluids without conventional time consuming plating techniques and, although specific reference is made hereinafter to urine, the following operating limits provide a general regime which those skilled in the art may employ as described or by appropriate modification in the analysis of a particular organism.

TABLE I

Operating conditions for dynamic microbiological analysis

Dynamic countnig medium: 90% by volume of 2% NaCl solution 10% by volume brain heart infusion broth (full strength, made particle free by filtration)

Holding medium (Amies Transport): 10 ml.; 2 ml. of sample is flowed onto surface without charcoal Storage temperature for holding: 20°–25° C.

Standard dilution for test fluids to counting medium: 1:50; 1:100; 1:250

Incubation temperature: 37° C.

Analysis volume: 0.05 ml.

Aperture size: $30\mu$ diameter and $100\mu$ diameter

Monitoring range, bacterial: $0.2\mu$ to $2.0\mu$ apparent diameter.

This invention provides a means for the evaluation of the effect of an antimicrobial challenge on a living micro-organism. By the term "antimicrobial challenge" is meant to include physical, biological and chemical treatments which have an adverse effect on microbial life. It includes autoclaving, radiation, and the application of any chemical agent which kills or inhibits microbes. Those skilled in the art will appreciate that the selection of effective antibiotics for the treatment of bacterial infections will be a preferred application of this method in view of the rapidity with which results are obtained.

This method comprises first determining that a viable micro-organism has been isolated. To determine this, the particular organism is placed in a standard media and analyzed to determine if it exhibits a growth response. This may be done by making two or more determinations of the total number and particle size distribution of the organism and evaluating growth in terms of an increasing population. Then the culture is diluted to obtain a sufficient number of growing samples by dilution to about 1:5 to about 1:20, preferably from about 1:10 of the growing organism. The selection of an appropriate dilution is based on the amount of diluent which will yield a final concentration of from about 200 to about 5,000 organisms per ml. One sample is preferably set aside as a control and one or more samples may be treated with selected doses of the particular antimicrobial challenges which are to be evaluated.

Thereafter, the samples are re-analyzed one or more times, preferably three times, to determine if the treated micro-organism exhibits a growth response. This may be compared with the control sample if a control is employed to verify the results. The micro-organism is sensitive if it does not exhibit a growth response or if it exhibits a decreased growth rate. Decreased growth rate is readily detected by plotting the results obtained with a control and the results obtained with the treated micro-organism on a graph of the type illustrated in FIG. 2.

Those skilled in the art will appreciate that this method will be especially adapted to the determination of optimal methods of treating mixed bacterial infections. This is because the dilution of the samples permits independent growth of each population and therefore, the antimicrobial agents may be evaluated with respect to their effect on each species. This is of particular importance in medical practice as it provides near real-time data which is closely related to the dynamic in vivo conditions which relate to mixed bacterial infections.

This invention also includes methods determining a course of therapy which is based on the phenomenon of the inhibition of pathogenic organism by the presence of non-pathogenic organism. This is well kown and has been described in the literature. Prior to this invention, no practical use in medical practice has been made in this phenomenon as no real-time means of determining the interactive growth characteristics of microbial populations has been available. In selecting an inhibitor organism for a particular pathogen, the growth characteristics for the pathogen are determined while simultaneously determining the growth characteristics of several organisms of lesser patient morbidity. Thereafter, based on the growth rate as determined by the series of integrated counts, a prediction is made of the number of organisms which will be present at a future fixed point in time. Then, appropriate dilutions with growth fluids are calculated for each sample to give respectively a fixed concentration of pathogen and a slightly higher concentration of inhibitor. Thereafter, the dilution of pathogen is combined with the particular inhibitors and the growth response of the various dilutions is observed to determine the degree of effectiveness of the particular inhibitors. An appropriate inhibitor is selected based on the degree of effectiveness and is prepared in a suitable concentration and form for administration to the human or animal host. The forms of administration include oral, parenteral, inhalation, topical etc., and the inhibitors may be formulated according to standard techniques depending on the chosen route of administration.

For example, a sample of lung fluid is obtained and, after appropriate dilution, a growth analysis as described herein is used to establish that a suspected pathogen is present in the lung fluid. Thereafter, a soil bacteria known to be non-toxic when inhaled, such as Achromobacter, is analyzed to determine its inhibitory effectiveness and based thereon an effective in vivo dosage to combat the pathogen is calculated. The effective amount of Achromobacter is administered by inhalation using a nebulizer or other suitable aerosolization dispersant means.

Figure 7:
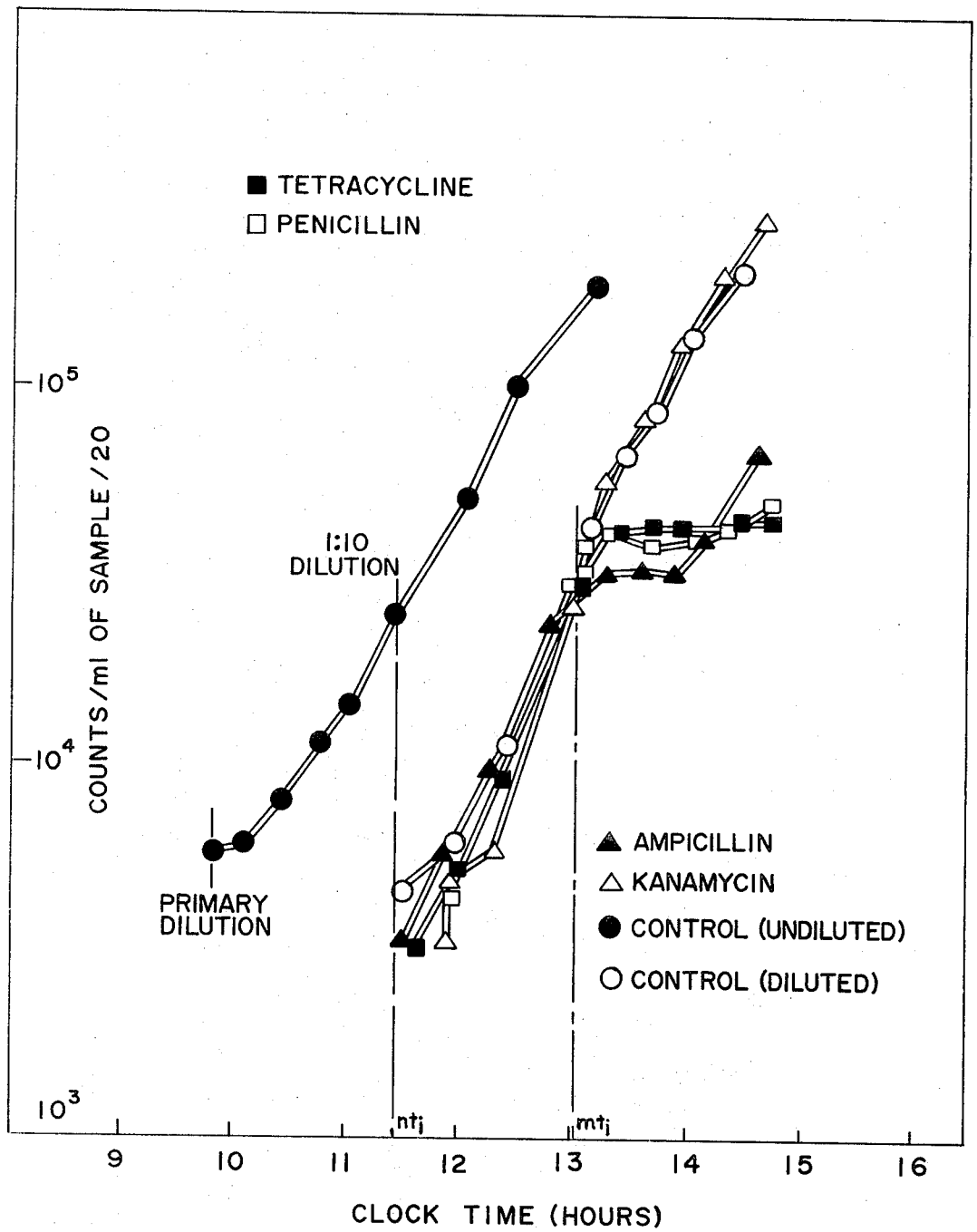
FIG. 7 is a growth/time graph which illustrates a dynamic analysis of a urine sample in which the effectiveness of four antibiotics was assayed.

The selection of a particular anti-microbial agent to be employed is not critical and those skilled in the art may employ any well-known anti-microbial agent. Suitable examples include ampicillin, kanamycin, tetracycline, penicillin, choramphenicol, streptomycin, sulfisoxazole and the like. The invention includes both the determination of the minimum inhibitory concentration and also the inhibitory effect of a given dosage of any anti-microbial substance. With ampicillin and kanamycin, it has been found convenient to employ 1 mg./ml. of dilution in evaluating the inhibitory effects on growing organisms.

The invention also provides a method of optimizing the dosage level of an anti-microbial drug by providing near real-time information as to state of the infectious condition so that appropriate dose levels may be administered.

The following specific examples are illustrations of the methods of the invention and are not to be construed as limitations thereof.

EXAMPLE I

A fresh sample of urine is obtained from a patient who exhibits clinical manifestations of a bacterial infection and is immediately put into the analysis system. If necessary, the sample may be held at room temperature (23° C.) for from 6 to 8 hours. When it is not possible to analyze a sample immediately, it has been found that storage at room temperature yields results which correlate more closely with the results of immediate testing than results obtained from frozen or refrigerated samples.

The urine sample is diluted to 1:250 by placing 0.2 ml. of the urine in a sufficient amount of a particle free growth fluid (2% w./v. saline containing 10% v./v. of a full nutrient (complete) growth media such as brain heart infusion broth or trypticase soy broth) to make 50 ml. of fluid.

The 50 ml. prepared sample is quickly placed in a beaker which is then placed in contact with the sensor pulse generator of the biological multichannel analyzer. This takes about 5 seconds and may be considered instantaneous for practical purposes. A time clock is punched at the instant the analyzer begins its analysis interval and this time is called time zero ($t_0$). The initial analysis of the sample as well as the subsequent analyses takes about 15 seconds. At the end of this time period, the number and particle size distribution of the particles in the dilution have been counted and recorded in digital form. The particle size distribution is then plotted as an analog envelope of the maximum count in each channel giving an X–Y graph. The particle sizes are plotted along the abscissa and the number of each size are plotted along the ordinate. The multichannel analyzer also includes means for giving a total number of particles within the size limits. This is shown on FIG. 1 as the integral A. Hereinafter, reference is made to FIG. 1 and FIG. 2 to further describe this procedure. The data may also be recorded on a printed tape, if desired. The data in this example was erased after it was integrated, printed out and plotted on the graph of FIG. 2 (A—$t_0$).

After an interval in the order of 5–20 minutes the analysis is repeated and the time recorded ($t_1$, the interval being $\Delta t_1 = t_1 - t_0$). These results are read and integral ∫B is calculated and plotted on the graph of FIG. 2. After the next $t_1$ interval (approximately 20 minutes), the analysis is repeated and integral ∫C is plotted in FIG. 2. This indicates that there is organism growth. Thereafter, D, E, and F may be plotted, however, it will be seen at D that there is a ten-fold increase in the integrated total within the size limits that were selected and the organism is in the log phase.

At time $nt_1$ the sample is diluted 1:10. The integrated count for three samples is taken immediately after dilution and as shown in FIG. 2, G, H and I are the same and are approximately the same value as $t_0$. Prior to making the 1:10 dilution, a control sample is set aside and this is analyzed and recorded as points E and F on FIG. 2.

After $\Delta t_1$ interval of time, the three samples are analyzed and the results are integrated and plotted as J, K and L on FIG. 2. At this point, it is noted that the diluted 1:10 samples are all growing at the same rate as the undiluted sample. At this point, 1 mg. of antibiotic A/ml. of sample is added to post J sample and 1 mg. of antibiotic B/ml. of sample is added to post K sample. Post L sample is maintained as a control and is reported in FIG. 2 at P.

The post J and K samples are immediately analyzed and the results are integrated and plotted as M and N. After a time, ∫Q and ∫R are taken and the results plotted as Q and R on the graph of FIG. 2.

The results indicate that the antibiotic A treated sample Q has the same growth as control sample P while the sample which is treated with antibiotic B shows a decrease in growth as reported at R. The total elapsed time for the procedure is about 3–5 hours.

EXAMPLE II

The procedure of Example I is carried out to obtain an X–Y plot of a particular sample at 45 minute intervals. The results of the particle size distribution, total count and time are plotted on a three-dimensional graph such as shown in FIGS. 3–6 which are standards which have been prepared from reference cultures. By comparison with previously prepared reference curves of known organisms, the particular genus of the organism is determined.

EXAMPLE III

A sample of urine is analyzed according to the method of Example I to determine the existence and subsequent growth response of the organism or organisms contained therein. Thereafter, a control sample is set aside and a number of 1:10 dilutions of the remaining sample of the growing organism are prepared. The diluted samples are analyzed to confirm that a normal growth response is present. One diluted sample is designated as a control and 1 mg. quantities of kanamycin, ampicillin, tetracycline and penicillin are added to each of four diluted samples. Each sample is analyzed for growth response as shown in FIG. 7. It is seen by reference to FIG. 7 that the growth response of the dilute sample treated with tetracycline was the poorest and therefore, tetracycline is the drug of choice for treating the organism or organisms present. By reference to the sample treated with ampicillin, it is seen that it was initially effective but lacked sustained effectiveness. Also, it is shown that kanamycin was for all practical purposes ineffective against the organism or organisms which were present. FIG. 7 also demonstrates that while penicillin was effective initially, it failed to control the organism or organisms present as shown by a delayed slow resumption of growth after approximately one hour of inhibited growth. Based upon the results, penicillin would be the second drug of choice and would be first choice to be used on a patient who could not tolerate tetracycline.

Although the invention has been described with reference to the preferred embodiments, many modifications and variations may be made thereto without departing from the spirit and scope of the ivnention. All such modifications and variations are intended to be included within the appended claims.

What is claimed is:

1. A method for the identification of a living micro-organism which comprises successively passing, at predetermined time intervals, a given sample of an unknown living micro-organism in a liquid suspension which comprises electrically conductive standard culture medium, through a particle detecting means to obtain indications of the change in the total number of micro-organisms and the particle size distribution thereof; and thereafter, comparing the indications obtained from the successive passages of the given sample with results previously obtained with known micro-organisms in order to identify the micro-organisms.

2. A method as defined in claim 1 wherein the particle detecting means is an electric field which is provided by passing a current between two electrodes that are separated in different insulating vessels which communicate with each other via an aperture window.

3. A method as defined in claim 2 wherein the liquid suspension of the unknown micro-organism is drawn through the aperture window by a pressure differential.

4. A method as defined in claim 1 wherein a pulse height analyzer is employed to obtain the indications of the total number of micro-organisms and their particle size distribution.

5. A method as defined in claim 2 wherein the unknown micro-organism is passed through the electric field at least two times.

6. A method for the determination of the sensitivity of a micro-organism to an antimicrobial challenge which comprises passing a given sample of a micro-organism in a liquid suspension which comprises a electrically conductive standard culture medium through a particle detecting means and obtaining indications of the number of micro-organisms and the particle size distribution thereof; applying an antimicrobial challenge; and thereafter, successively passing said sample through a particle detecting means to determine indications of the number of micro-organisms and the particle size distribution thereof to determine if the micro-organism exhibits a growth response;

7. A method as defined in claim 6 wherein the antimicrobial challenge is an antibiotic.

8. A method as defined in claim 6 wherein the antimicrobial challenge is another micro-organism.

9. A method as defined in claim 7 wherein the particle detecting means is provided by passing a current between two electrodes that are separated in different insulating vessels which communicate wtih each other via an aperture windows.

10. A method as defined in claim 7 wherein a pulse height analyzer is employed to obtain the indications of the number of micro-organisms and the particle size distribution thereof.

11. A method as defined in claim 7 wherein prior to the antimicrobial challenge, the liquid sample is diluted and one sample is run as an untreated control.

12. A method for the determination of an effective amount of an anti-microbial challenge to be employed in the inhibition of a particular micro-organism which comprises determining the growth response of the particular organism by passing a given sample of said particular organism in a liquid suspension which comprises a electrically conductive standard culture medium, through a particle detecting means to obtain indications of the change of the total number of organisms and particles size distribution thereof; determine the amount of the antimicrobial challenge which will inhibit the particular organism by successively applying increasing increments of the antimicrobial challenge and thereafter analyzing the particular organism to determine the growth response.

13. A method as defined in claim 12 wherein the antimicrobial challenge is an organism capable of inhibiting the particular organism.

References Cited

UNITED STATES PATENTS 3,743,581   7/1973   Cady et al. _____ 195—103.5 R

LIONEL M. SHAPIRO, Primary Examiner

R. J. WARDEN, Assistant Examiner

U.S. Cl. X.R.

324—71 R